UNITED STATES PATENT OFFICE.

WILLIAM CHITTENDEN TAYLOR, OF CORNING, NEW YORK, ASSIGNOR TO CORNING GLASS WORKS, OF CORNING, NEW YORK, A CORPORATION OF NEW YORK.

GLASS AND PROCESS OF MAKING SAME.

No Drawing.    Application filed November 29, 1920.  Serial No. 427,114.

*To all whom it may concern:*

Be it known that I, WILLIAM CHITTENDEN TAYLOR, a citizen of the United States of America, and a resident of Corning, county of Steuben, State of New York, have invented certain new and useful Improvements in Glass and Processes of Making the Same, of which the following is a specification.

Various agents, including manganese dioxide, nickel oxide and selenium, have been added to glasses. In all ordinary glasses one or the other of these agents will produce a pink color, and if used in sufficiently small quantities will, while not coloring the glass, effectively neutralize the green tint, due to the presence of small quantities of oxide of iron in the glass, and thus deprive the latter of distinctive color.

If, however, the glass is acidic, such as are the low expansion boro-silicate glasses, none of the above named agents can be used effectively, either for coloring the glass pink or for decolorizing it, as with such glasses these agents tend to produce, not a pink, but a color varying from yellow to dull amber.

The color produced by oxide of iron, in acidic borosilicate glasses is yellow whereas in ordinary glasses it is green. Thus manganese oxide, nickel oxide, and selenium so effective in neutralizing the green tint of ordinary glasses only intensify the yellow making the glass more of an amber. I have discovered, however, that neodymium oxide ($Nd_2O_3$) can be used effectively for decolorizing low expansion borosilicate glasses. Neodymium oxide which produces a lilac hue in ordinary glasses is not effective there as a decolorizer because its chief absorption band is in the yellow and it only neutralizes green when present in too great a concentration for the ordinary clear glass. Unlike manganese oxide, nickel oxide, and selenium, the hue produced by neodymium oxide is not uniformly changed in borosilicate glasses and due to its peculiar absorption of the yellow and its tendency to a flesh tint in deep layers it is quite well suited to decolorize such glasses.

The acidity of the glass above referred to may be due to several causes, including the presence and proportion therein of acid oxides (i. e. $SiO_2$ and $B_2O_3$), as modified by the percentage of alkaline ingredients (i. e., $Na_2O$, $K_2O$, $Li_2O$). The presence of oxides of the second group of the periodic elements (i. e. magnesium calcium, barium) as well as of oxides of lead, also tend to reduce acidity, although not as strongly as the alkaline oxides. As examples of glasses, to which this invention may be employed, the following compositions thereof are given,—

| | I. | II. | III. | IV. | V. | VI. | VII. | VIII. | IX. | X. | XI. | XII. | XIII. |
|---|---|---|---|---|---|---|---|---|---|---|---|---|---|
| | % | % | % | % | % | % | % | % | % | % | % | % | % |
| $SiO_2$ | 70 | 70 | 60 | 60 | 80 | 85 | 90 | 61 | 70 | 80.6 | 80.9 | 90 | 90 |
| $B_2O_3$ | 24 | 15 | 20 | 30 | 6 | 5 | 2 | 11 | 20 | 13 | 12.9 | 6 | 5 |
| $Na_2O$ | 5 | 15 | 10 | 10 | 12 | 10 | 8 | 8¼ | 4 | 4.4 | 4.4 | 3 | |
| $Al_2O_3$ | 1 | | 10 | | 2 | | | 6¾ | 6 | 2 | 1.8 | 1 | 2 |
| PbO | | | | | | | | 13 | | | | | |
| $Li_2O$ | | | | | | | | | | | | | 3 |

It will be understood that in lieu of the $Na_2O$ of the above formula, other alkali oxides (i. e, $K_2O$, or $Li_2O$) may be used, and that in lieu of the $Al_2O_3$ or PbO basic oxides ordinarily used in glass, (such as those of the second group of the periodic system, or of lead), may be substituted. It is to be noted that antimony oxide ($Sb_2O_3$) should not be present in large amount as it prevents the desired action of the neodymium oxide, and the same is believed to be true of the other oxides of fifth group of the periodic system. Small amounts, however, of arsenic or antimony may be used without injurious effect.

It is difficult to obtain neodymium oxide in a state of purity, but the invention may be carried out by using what is commercially known as "didymium oxide," which is a mixture of neodymium oxide and lanthanum oxide or any material containing neodymium oxide, mixed with other substances, whose coloring action does not interfere with the coloring action of the neodymium, or, whose presence does not destroy the acid character of the glass and which is otherwise unobjectionable.

A small percentage of neodymium oxide, (say from ½ to 1 per cent) added to the batch for melting any of the above glasses is effective for decoloring, and it has been found advisable to use an oxidizing batch, (such as one containing a small amount of $NaNO_3$) as the color produced by neodymium is more nearly complementary to that produced by oxidized iron than produced by reduced iron.

If it is desired to produce a pink color, the amount of neodymium oxide may be increased, say to 5%, with a corresponding decrease in the percentage of the other ingredients of the above compositions. However, neodymium oxide may be substituted for an equal percentage of silica in all of the above formulæ, except that the amount which may be substituted is limited to less than 5% in some cases by the nature of the glass.

With such substitution, the percentage composition of glass II becomes,—

| | |
|---|---|
| $SiO_2$ | 65% |
| $B_2O_3$ | 15% |
| $Na_2O_3$ | 15% |
| $Nd_2O_3$ | 5% |

Generally speaking, boro-silicate glasses sufficiently acidic to give the above described coloring to neodymium oxide when such oxide replaces a part of the silica, or to give the desired decolorizing thereby, will be found to conform to the following rules,—

A. To contain not less than 80% silica; (examples are compositions 5, 6, 7, 10, 11, 12 and 13), or B. To contain not less than 75% of silica, with a boric oxide percentage not less than 40% of the constituents other than the silica; (examples are compositions 6 and 10, to 13, inclusive), or:

C. To contain not less than 70% of silica, with a boric oxide content not less than the alkali content; (examples are compositions 1, 2, and 8 to 13, inclusive), or, with a boric oxide content not less than 50% of the total constituents other than silica, (examples are compositions 1, 2 and 9 to 13, inclusive); or D. To contain boric oxide in an amount not less than 50% of the total constituents other than the silica, (examples are 1 to 4, inclusive, 6 and 9 to 13, inclusive).

E. To contain not less than 60% of silica, and to have a boric oxide content not less than 25% of the total constituents other than silica; (examples are any of the above compositions).

Having thus described the invention what is claimed, and is desired to secure by Letters Patent, is:—

1. The hereinbefore described method of overcoming the yellow tint imparted to acid boro-silicate glasses by iron oxide which consists in adding a salt of neodymium oxide to the batch from which such glass is melted.

2. The hereinbefore described method of overcoming the yellow tint imparted to acid boro-silicate glasses by iron oxide which consists in adding an oxidizing substance, and a salt of neodymium to the batch from which said glass is melted.

3. A boro-silicate glass containing neodymium oxide and silica, boric oxide and alkali, and in which the silica is not less than 60% of the constituents, and the boric oxide is not less than 25% of the constituents other than the silica, and in which the ratio of boric oxide to alkali is not less than three to two.

4. A boro-silicate glass containing neodymium oxide and silica, and boric oxide, the boric oxide comprising not less than 50% of the constituents other than the silica.

5. A boro-silicate glass containing neodymium oxide and containing silica, boric oxide, and alkali, and in which the silica is not less than 70% of the total constituents of the glass, and the ratio of silica constituents to alkali constituents is not less than one to one.

6. A boro-silicate glass containing neodymium oxide, and containing silica, boric oxide, and alkali, and in which the silica is not less than 70% of the total constituents of the glass, and the percentage of boric oxide is not less than 50% of the constituents other than the silica.

7. A boro-silicate glass containing neodymium oxide, and containing silica, boric oxide, and alkali, and in which the silica is not less than 75% of the total constituents of the glass, and the percentage of boric oxide is not less than 40% of the total constituents other than silica.

8. A boro-silicate glass containing neodymium oxide, and containing silica, boric oxide, and soda, in which the silica is not less than 80% of the total ingredients of the glass.

9. A boro-silicate glass containing in addition to neodymium oxide, silica, boric oxide, sodium oxide and aluminum oxide in substantially the following proportions,—

| | |
|---|---|
| Silica | 81% |
| Boric oxide | 13% |
| Sodium oxide | 4% |
| Alumina oxide | 2% |

In testimony whereof I hereunto sign my name this 25th day of November, 1920.

WILLIAM CHITTENDEN TAYLOR.